United States Patent
Dickman, Jr. et al.

(10) Patent No.: US 10,935,145 B2
(45) Date of Patent: Mar. 2, 2021

(54) GAS LINE COCKVALVE MAINTENANCE DEVICE AND METHOD OF OPERATION

(71) Applicant: Consolidated Edison Company of New York, Inc., New York, NY (US)

(72) Inventors: Richard Joseph Dickman, Jr., Saddle Brook, NJ (US); Gerald Anthony Gatto, III, Goshen, NY (US)

(73) Assignee: CONSOLIDATED EDISON COMPANY OF NEW YORK, INC., New York, NY (US)

( * ) Notice: Subject to any disclaimer, the term of this patent is extended or adjusted under 35 U.S.C. 154(b) by 0 days.

(21) Appl. No.: 16/389,366

(22) Filed: Apr. 19, 2019

(65) Prior Publication Data

US 2019/0383406 A1    Dec. 19, 2019

Related U.S. Application Data

(60) Provisional application No. 62/685,092, filed on Jun. 14, 2018.

(51) Int. Cl.
| | | |
|---|---|---|
| *F16K 5/02* | (2006.01) | |
| *F16N 3/12* | (2006.01) | |
| *F16K 35/10* | (2006.01) | |
| *F16N 29/02* | (2006.01) | |

(52) U.S. Cl.
CPC ............ *F16K 5/0292* (2013.01); *F16K 35/10* (2013.01); *F16N 3/12* (2013.01); *F16N 29/02* (2013.01); *F16N 2280/00* (2013.01)

(58) Field of Classification Search
CPC ...... F16K 5/0292; F16N 3/12; F16N 2280/00; B65B 3/04
See application file for complete search history.

(56) References Cited

U.S. PATENT DOCUMENTS

| | | | | |
|---|---|---|---|---|
| 1,964,005 | A * | 6/1934 | Morton ..................... | F16N 5/02 91/49 |
| 2,019,955 | A * | 11/1935 | Eastman .................. | F16N 3/12 222/331 |
| 3,180,533 | A * | 4/1965 | Sundholnn ................ | F16N 3/12 222/256 |
| 3,552,406 | A * | 1/1971 | Whaley ..................... | F16N 7/30 134/167 R |
| 3,960,167 | A | 6/1976 | Ros | |
| 4,338,981 | A * | 7/1982 | Frauenberger ............ | F16K 3/36 137/237 |
| 5,884,818 | A * | 3/1999 | Campbell ......... | B05C 17/00576 222/256 |
| 9,097,385 | B2 * | 8/2015 | Gurney ................. | F16K 15/183 |
| 2005/0150555 | A1 | 7/2005 | James | |
| 2014/0130830 | A1 * | 5/2014 | Loussaert ................ | B08B 9/00 134/18 |

(Continued)

*Primary Examiner* — Kevin L Lee
(74) *Attorney, Agent, or Firm* — Cantor Colburn LLP

(57) ABSTRACT

A system and method of performing maintenance on a wing cock valve coupled to a pressurized gas delivery pipe is provided. The method removing a plug from a port on the valve. A threaded portion of a grease tool is coupled to the port, the grease tool having a body coupled to the threaded portion and a fitting on an opposite end, the fitting, body and threaded portion defining a flow path. A hose is coupled on a grease gun to the fitting; and actuating the grease gun to flow a grease from a reservoir through the flow path and into the valve.

17 Claims, 4 Drawing Sheets

(56) References Cited

U.S. PATENT DOCUMENTS

2015/0266142 A1* 9/2015 Klaphake et al. .. F15B 13/0842
                                                    29/890.12
2020/0011152 A1* 1/2020 Kravitch ................. E21B 33/12

* cited by examiner

GAS LINE COCKVALVE MAINTENANCE DEVICE AND METHOD OF OPERATION

CROSS REFERENCE TO RELATED APPLICATIONS

This application claims the benefit of U.S. Provisional Application Ser. No. 62/685,092, filed Jun. 14, 2018, the entire disclosure of which is incorporated herein by reference.

BACKGROUND

The subject matter disclosed herein relates to valves for liquid or gas pipes, and in particular to a device and method for maintaining a gas line valve to eliminate leakage.

Natural gas delivery systems, such as those that deliver gas to a residential unit, utilize pipes that are connected to the house via a valve, such as a wing cock valve, and a meter. Typically, the pipe is mostly disposed underground and rise to the surface adjacent the where the pipe is to enter the building. The valve is used to disconnect service to the building when repairs are to be performed. In many instances, the valve may be located in an inconvenient location, such as behind shrubbery for example. Accessing the valve is even more difficult when the operations are being performed in the dark.

Periodically, the valve requires maintenance. When maintenance is not performed, the valve may start to leak. The maintenance involves removing a cap or plug from a port on the valve using a hexagonal (Allen-key) type wrench. A grease is forced into the port and the plug is inserted back into the port and threaded on to force the grease into the interior of the valve. It should be appreciated that the valve remains pressurized with gas as the maintenance is being performed. As a result, the pressurized gas will tend to blow or force the grease out of the valve. The re-insertion of the plug helps pack the grease into the valve. The process of removing the plug, forcing in the grease and re-installing the plug typically needs to be repeated four to five times in order to apply sufficient grease to the valve.

It should be appreciated that removing the plug with the hexagonal key places stress on the key portion of the plug. If the key portion of the plug is stripped, the entire valve will be replaced. This results in disruption of the customer's service. To replace a valve, separate personnel need to be locate and turn off a curb valve (a valve, typically underground, located near the street). In some cases the curb valve is not accessible and excavation personnel will dig up the street or the customer's driveway to find the curb valve.

While existing wing cock valves and the methods of maintaining them are suitable for their intended purposes, a need for improvement remains in providing a device and method for maintaining the valve without stripping the port plug.

BRIEF DESCRIPTION

According to one aspect of the invention, a system and method of performing maintenance on a wing cock valve coupled to a pressurized gas delivery pipe is provided. The method comprises: removing a plug from a port on the valve; coupling a threaded portion of a grease tool to the port, the grease tool having a body coupled to the threaded portion and a fitting on an opposite end, the fitting, body and threaded portion defining a flow path; coupling a hose on a grease gun to the fitting; and actuating the grease gun to flow a grease from a reservoir through the flow path and into the valve.

According to another aspect of the invention, a system for performing maintenance on a wing cock valve coupled to a pressurized gas delivery pipe. The wing cock valve having a port closed by a plug, the plug having a hexagonal keyway. The system including a grease tool and a grease gun. The grease tool having a body with a threaded portion on one end and a fitting on an opposite end, the threaded portion sized to engaged the port. The grease gun having a grease reservoir, a pump mechanism and a flexible hose, an end of the flexible hose being configured to couple with the fitting.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Embodiments of the present disclosure provide advantages in performing maintenance on wing cock valves, such as those used in the delivery of natural gas. Further embodiments of the present disclosure provide advantages in a greasing tool that allows the insertion of grease into the wing cock valve with the risk of stripping the valve plug being greatly reduced or eliminated.

Figure 1:
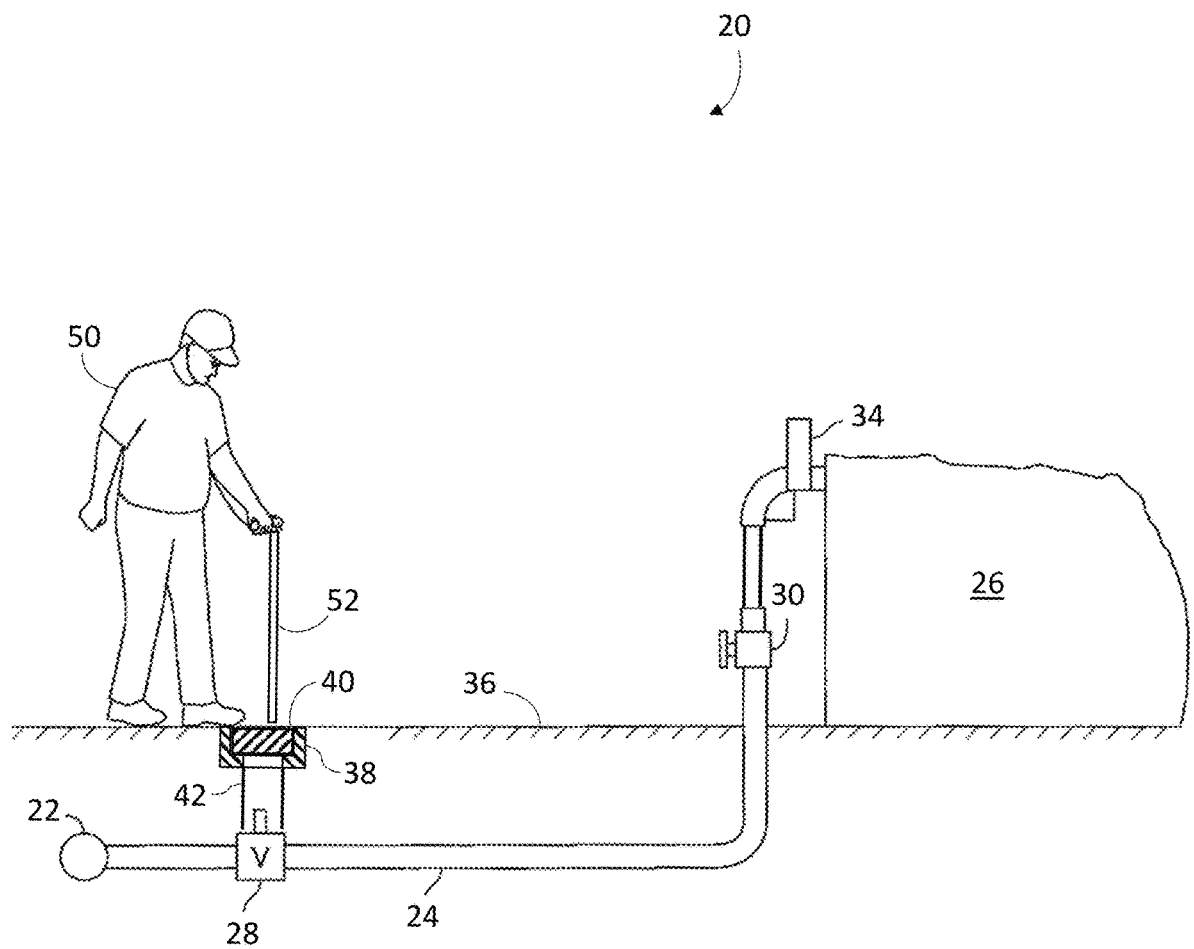
FIG. 1 is schematic view of a underground gas system in accordance with an embodiment.

Referring to FIG. 1, an embodiment is shown of a gas delivery system 20. The gas system 20 includes a main gas pipe 22 which includes one or more branch conduits 24 that connect the main gas pipe 22 to a consumer 26, such as a residential house for example or another gas pipe same as pipe 22. The system 20 may include a number of valves 28, 30 that control the flow of gas, such as natural gas for example, to the consumer 26. The amount of gas used by the consumer 26 is measured by a meter 34.

Some of the valves, such as valve 28 may be disposed below ground level 36. It should be appreciated that while the illustrated embodiment shows the underground valve 28 as being to the branch pipe 24 (sometimes referred to as a curb valve), this is for exemplary purposes and the claims should not be so limited and underground valves may be located on the main gas pipe 22. In some instances, to access these subterranean valves, an access structure is provided, such as the valve box 38 for example. The valve box 38 has a removable cover 40. The valve box 38 has an opening in the bottom that provides access to a riser shaft 42. The riser shaft 42 is generally a hollow cylindrical body (e.g. a pipe) that creates an airspace beneath the valve box 38. Generally, the underground valve, such as valve 28, is located directly below and at least partially within the riser shaft 42. It should be appreciated that in some embodiments, the valve 28 may be buried with no direct access from the surface.

Figure 2:
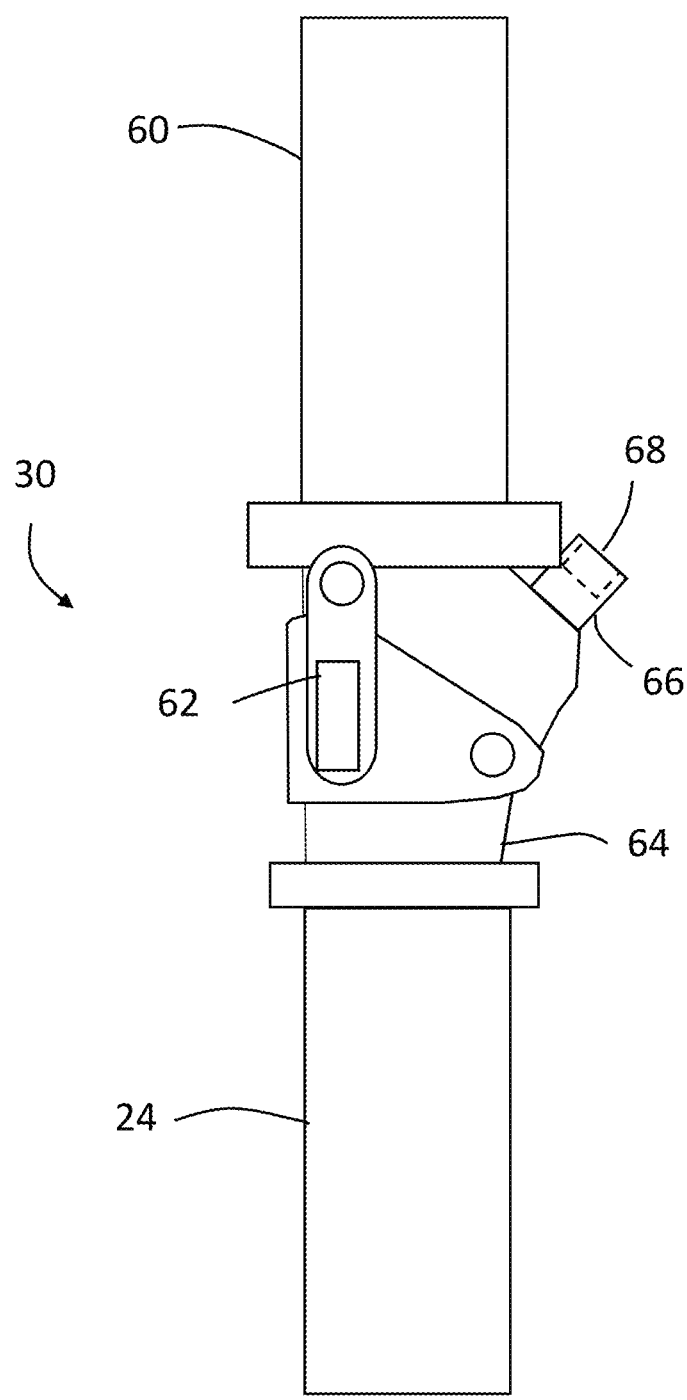
FIG. 2 is a side view of a wing cock valve in accordance with an embodiment.

Referring now to FIG. 2, an embodiment of the wing cock valve 30 is shown. The valve 30 has an inlet connected to pipe 24 and an outlet connected to pipe 60. The pipe 60 extending from the valve 30 to the meter 34. The valve 30 includes a handle 62 that is movable from an open to a closed position. The handle 62 is coupled to an internal mechanism that changes the state of the valve from being open (e.g. gas flows to outlet pipe 60) to a closed state (e.g. no gas flows through to outlet pipe 60). The valve 30 includes a body 64 having a port 66. The port 66 is closed with a plug 68. The plug 68 includes a hexagonal recess or keyway on an end that is sized to receive a hexagonal (e.g. Allen key) wrench or key. When the plug 68 is removed, the port 66 provides a passageway into the internal mechanism for the insertion of grease.

Figure 3:
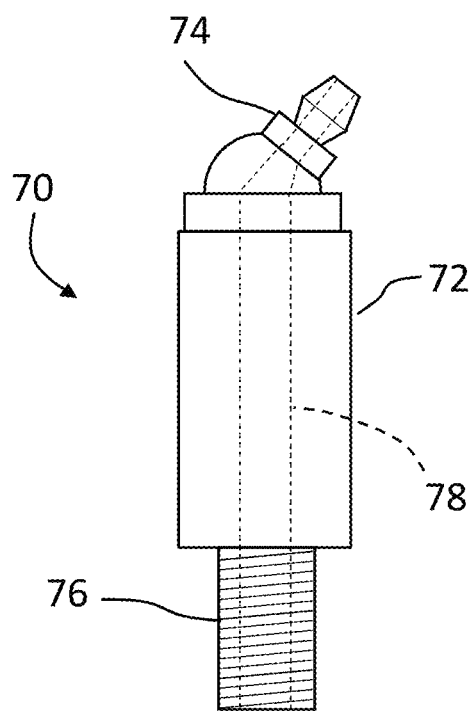
FIG. 3 is a side view of a greasing tool in accordance with an embodiment.

Referring now to FIG. 3, an embodiment is shown of a grease tool 70. The tool 70 includes a body 72 with a fitting 74 on one end. In an embodiment, the fitting 74 is disposed on an angle relative to the longitudinal axis of the body 72. In an embodiment, the fitting 74 is a Zerk or an Alemite type fitting. Attached on an opposite side of the body 72 from the fitting 74 is a threaded portion 76. The threaded portion 76 is sized to couple with the port 66. The tool 70 includes an internal flow path 78 that allows grease to flow from an inlet of the fitting 74 through the body 72 and out the outlet of the threaded portion 76.

Figure 4:
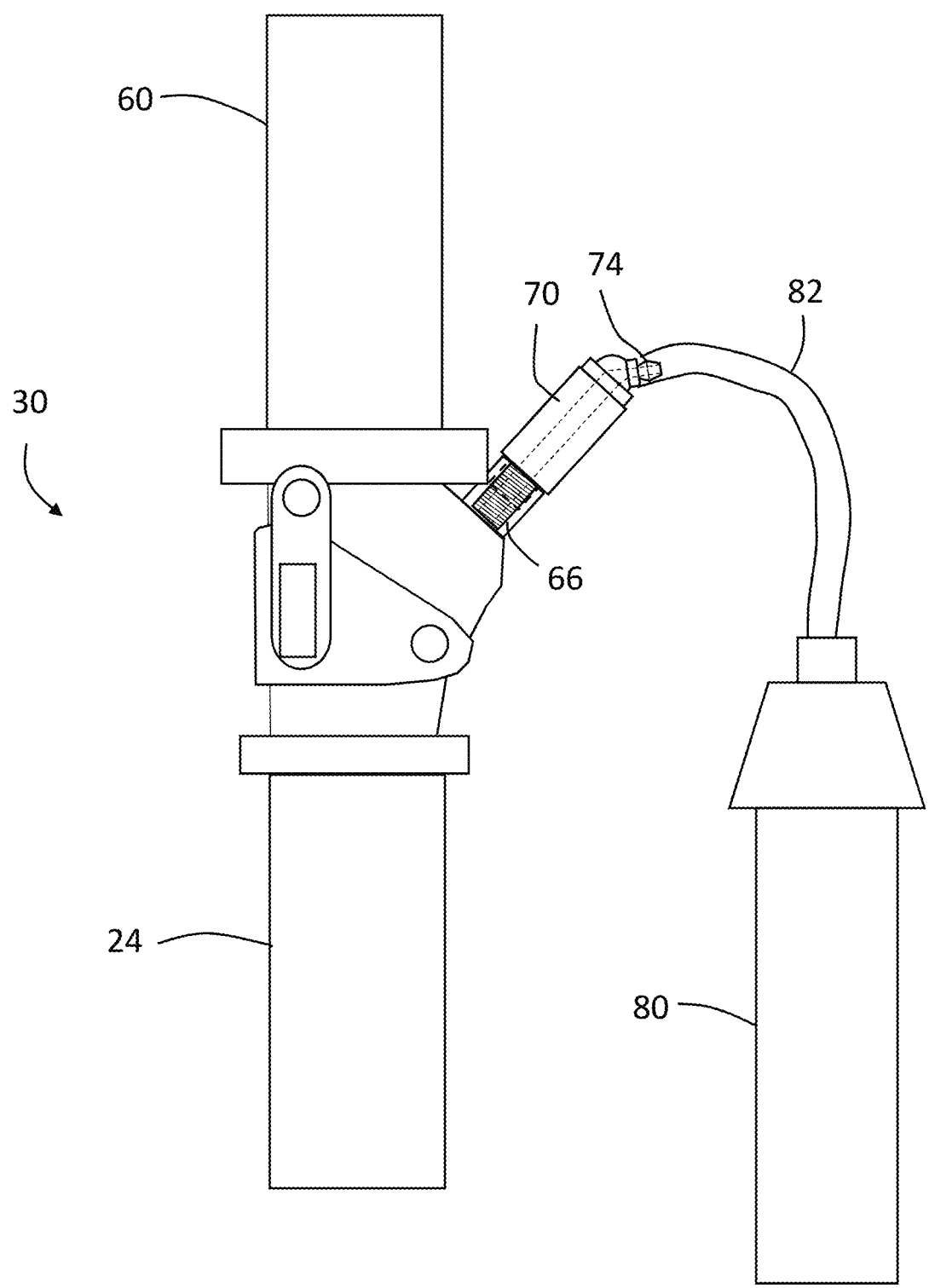
FIG. 4 is a side view of the wing cock valve of FIG. 2 with the greasing tool of FIG. 3 installed and a grease gun coupled to the greasing tool.

When a leak has been detected near a meter 34, in many instances the leak is due to the grease within the valve 30 drying out and degrading the integrity of the internal mechanism, such as the protective shield. To resolve this issue, maintenance may be performed by replenishing the grease within the internal mechanism of the valve. To service the valve 30, the service personnel locate the valve 30 and remove the plug 68. It should be appreciated that the valve 30, even with the handle 62 in the open position, will be pressurized and gas will flow through the port 66. As shown in FIG. 4, the service personnel then install the tool 70 by threading the threaded portion 76 into the port 66. With the tool 70 coupled to the valve 30, a flexible hose 82 is coupled to the fitting 74. The flexible hose 82 is connected on an opposite end to a grease gun 80. It should be appreciated that the grease gun 80 may include a grease reservoir (not shown) and a pumping mechanism (not shown) as is known in the art. Once the hose 82 is connected, the grease gun 80 may be actuated to force grease from the reservoir through the hose and tool 70 into the valve 30.

It should be appreciated that once the hose 82 is coupled to the fitting 74, the gas will stop flowing through the port 66. Once a desired amount of grease is transferred via tool 70 and port 66 into the valve 30, the service personnel disconnect the hose 82 and uncouple the tool 70 from the port 66. The plug 68 is reinstalled and the valve 30 may be returned to service. It should be appreciated that the use of the tool 70 greatly reduces the number of times a wrench is coupled to the plug 68. Rather than being removed and installed eight to ten times, the plug 68 is simply removed and installed once. Thus, the risk of stripping the keyway from the plug 68 is greatly diminished.

Embodiments of the present disclosure provide advantages in reducing the risk that a wing cock valve being used in natural gas delivery service will be replaced during maintenance operations.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of performing maintenance on a cock valve coupled to a pressurized gas delivery pipe, the method comprising:
    removing a plug from a port on the valve;
    coupling a threaded portion of a grease tool to the port, the grease tool having a fitting on an end opposite the threaded portion;
    coupling a hose on a grease gun to the fitting; and
    actuating the grease gun to flow a grease from a reservoir through a flow path and into the valve.

2. The method of claim 1, wherein the grease tool includes a body coupled to the threaded portion and a fitting on an opposite end, the fitting, body and threaded portion defining the flow path.

3. The method of claim 2, further comprising disconnecting the hose from the fitting when a desired amount of grease has been inserted into the valve.

4. The method of claim 3, further comprising removing the grease tool from the port.

5. The method of claim 4, further comprising reinstalling the plug into the port.

6. The method of claim 1, further comprising closing a curb valve prior to removing the plug from the valve.

7. The method of claim 1, further comprising detecting a gas leak near a meter.

8. The method of claim 7, further comprising determining the leak is due to a lack of grease in the cock valve.

9. A system for performing maintenance on a cock valve coupled to a pressurized gas delivery pipe, the cock valve having a port closed by a plug, the plug having a hexagonal keyway, the system comprising:
    a grease tool having a body with a threaded portion on one end and a fitting on an opposite end, the threaded portion sized to engaged the port, wherein the port is fluidly coupled to a valve internal mechanism and the gas delivery pipe; and
    a grease gun having a grease reservoir, a pump mechanism configured to couple with the fitting and flow grease from the grease reservoir into the valve internal mechanism.

10. The system of claim 9, wherein the fitting is a Zerk fitting.

11. The system of claim 9, wherein the fitting is an Alemite fitting.

12. The system of claim 9, wherein the grease gun further comprises a flexible hose coupled one a first end to the pump mechanism and configured to couple with the fitting on a second end.

13. A method of performing maintenance on a pressurized gas delivery system, the method comprising:
   providing a cock valve coupled to the pressurized gas delivery system, the cock valve having a port closed by a plug, the plug having a hexagonal recess or keyway;
   removing the plug from the port;
   coupling a threaded portion of a grease tool to the port, the grease tool having a fitting on an end opposite the threaded portion;
   coupling a hose on a grease gun to the fitting;
   stopping the flow of gas through the port when the hose is coupled; and
   actuating the grease gun to flow a grease from a reservoir through a flow path and into the valve.

14. The method of claim 13, wherein the grease tool includes a body arranged between the threaded portion and the fitting, body and threaded portion defining the flow path.

15. The method of claim 14, further comprising disconnecting the hose from the fitting when a desired amount of grease has been inserted into the valve.

16. The method of claim 15, further comprising removing the grease tool from the port after disconnecting the hose.

17. The method of claim 16, further comprising reinstalling the plug into the port after removing the grease tool.

* * * * *